(12) United States Patent
Murakawa et al.

(10) Patent No.: US 11,557,412 B2
(45) Date of Patent: Jan. 17, 2023

(54) FERRITE SINTERED MAGNET AND ROTATING ELECTRIC MACHINE COMPRISING THE SAME

(71) Applicant: TDK Corporation, Tokyo (JP)

(72) Inventors: Yoshitaka Murakawa, Tokyo (JP); Shogo Muroya, Tokyo (JP); Hiroyuki Morita, Tokyo (JP); Masanori Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 336 days.

(21) Appl. No.: 16/825,717

(22) Filed: Mar. 20, 2020

(65) Prior Publication Data

US 2020/0312495 A1  Oct. 1, 2020

(30) Foreign Application Priority Data

Mar. 27, 2019  (JP) .............................. JP2019-059939

(51) Int. Cl.
| | | |
|---|---|---|
| *H01F 1/11* | (2006.01) | |
| *C04B 35/26* | (2006.01) | |
| *H01F 1/10* | (2006.01) | |
| *H02K 1/02* | (2006.01) | |

(52) U.S. Cl.
CPC ................ *H01F 1/11* (2013.01); *C04B 35/26* (2013.01); *C04B 35/2641* (2013.01); *H01F 1/10* (2013.01); *C01P 2006/42* (2013.01); *C04B 2235/3208* (2013.01); *C04B 2235/3217* (2013.01); *C04B 2235/3241* (2013.01); *C04B 2235/3262* (2013.01); *C04B 2235/3274* (2013.01); *C04B 2235/3284* (2013.01); *C04B 2235/3409* (2013.01); *C04B 2235/3418* (2013.01); *C04B 2235/405* (2013.01); *C04B 2235/767* (2013.01); *C04B 2235/96* (2013.01); *H02K 1/02* (2013.01)

(58) Field of Classification Search
CPC .... H01F 1/11; H01F 1/10; H02K 1/02; C04B 35/2641; C04B 2235/767; C04B 2235/96; C04B 2235/3241; C04B 2235/3262; C04B 2235/3274; C04B 2235/3284; C04B 2235/3209
See application file for complete search history.

(56) References Cited

U.S. PATENT DOCUMENTS

| | | | |
|---|---|---|---|
| 2012/0105185 A1 | 5/2012 | Oda et al. | |
| 2015/0053883 A1 | 2/2015 | Taguchi | |
| 2015/0255198 A1* | 9/2015 | Murakawa | ................ H01F 1/11 |
| | | | 310/156.01 |
| 2015/0325350 A1 | 11/2015 | Taguchi | |
| 2015/0332819 A1 | 11/2015 | Oda et al. | |
| 2017/0207012 A1 | 7/2017 | Morita | |

FOREIGN PATENT DOCUMENTS

| | | | |
|---|---|---|---|
| CN | 104900362 | * | 5/2012 |
| CN | 102473514 | * | 9/2015 |
| EP | 3 633 697 A1 | | 4/2020 |
| JP | 2017-126719 A | | 7/2017 |
| WO | WO-2013/125600 A1 | | 8/2013 |
| WO | WO-2013/125601 A1 | | 8/2013 |
| WO | WO-2018/216594 A1 | | 11/2018 |

OTHER PUBLICATIONS

1610/KOLNP/2012 published Jan. 25, 2013.
Indian Office Action issued in Indian Patent Application No. 202044001012 dated Jul. 29, 2021.

* cited by examiner

*Primary Examiner* — C Melissa Koslow
(74) *Attorney, Agent, or Firm* — Faegre Drinker Biddle & Reath LLP (57) ABSTRACT

A ferrite sintered magnet comprising an M type Sr ferrite having a hexagonal structure as a main phase, wherein the ferrite sintered magnet comprises La and Co, a content of B is 0.005 to 0.9% by mass in terms of $B_2O_3$, a content of Zn is 0.01 to 1.2% by mass in terms of ZnO, and the ferrite sintered magnet satisfies [La]/[Zn]≤0.79 and [Co]/[Zn]≤0.67 when an atomic concentration of La is represented by [La], an atomic concentration of Co is represented by [Co], and an atomic concentration of Zn is represented by [Zn].

9 Claims, 2 Drawing Sheets

FERRITE SINTERED MAGNET AND ROTATING ELECTRIC MACHINE COMPRISING THE SAME

TECHNICAL FIELD

The present invention relates to a ferrite sintered magnet and a rotating electric machine comprising the same.

BACKGROUND ART

A Ba ferrite, Sr ferrite, and Ca ferrite having a hexagonal structure have been known as a magnetic material used for a ferrite sintered magnet. Among the above ferrites, considerable attention has recently been given to a magnetoplumbite type (M type) Sr ferrite as a magnet material of a rotating electric machine such as a motor. The M type ferrite is expressed by the formula, $AFe_{12}O_{19}$, and the M type Sr ferrite contains Sr at an A site.

The M type Sr ferrite containing no rare earth element and Co, which includes the M type Sr ferrite containing Na, for example, has recently been developed from the viewpoint of reducing the cost of raw materials.

CITATION LIST

[Patent Literature 1] International Publication No. WO 2013/125600
[Patent Literature 2] International Publication No. WO 2013/125601

SUMMARY

However, the ferrite sintered magnet containing no rare earth element and Co is expected to have further improved residual magnetic flux density (Br). The present invention was completed in view of the above matter, and an object of the present invention is to provide a ferrite sintered magnet containing only a small amount of a rare earth element and Co and having excellent residual magnetic flux density, and a rotating electric machine using the same.

A ferrite sintered magnet according to the present invention is a ferrite sintered magnet comprising an M type Sr ferrite having a hexagonal structure as a main phase. This magnet comprises La and Co, a content of B is 0.005 to 0.9% by mass in terms of $B_2O_3$,
a content of Zn is 0.01 to 1.2% by mass in terms of ZnO, and
the magnet satisfies $[La]/[Zn] \leq 0.79$ and $[Co]/[Zn] \leq 0.67$ when an atomic concentration of La is represented by [La], an atomic concentration of Co is represented by [Co], and an atomic concentration of Zn is represented by [Zn].

A content of Si can be 0.05 to 1.3% by mass in terms of $SiO_2$.

A content of Ca can be 0.15 to 2.0% by mass in terms of CaO.

The ferrite sintered magnet can satisfy $11.3 \leq [Fe]/[Sr] \leq 13.1$ when an atomic concentration of Fe is represented by [Fe] and an atomic concentration of Sr is represented by [Sr].

The ferrite sintered magnet satisfies $0.92 \leq [B+Ca+Zn]/[Si] \leq 11.42$ when a total atomic concentration of B, Ca, and Zn is represented by [B+Ca+Zn] and an atomic concentration of Si is represented by [Si].

The ferrite sintered magnet satisfies $0.4 \leq Z \leq 3.6$ when a total atomic concentration of Ca, Sr, Ba, and La is represented by [Ca+Sr+Ba+La], a total atomic concentration of Fe, Mn, Zn, Co, Cr, and Al is represented by [Fe+Mn+Zn+Co+Cr+Al], a total atomic concentration of Si and B is represented by [Si+B], and $Z = ([Ca+Sr+Ba+La]-[Fe+Mn+Zn+Co+Cr+Al]/12)/[Si+B]$.

The ferrite sintered magnet can comprise 0.25 to 1.5% by mass of Mn in terms of MnO.

The ferrite sintered magnet can comprise 0.03 to 0.2% by mass of Cr in terms of $Cr_2O_3$.

A rotating electric machine according to the present invention comprises the above-described ferrite sintered magnet.

According to the present invention, a ferrite sintered magnet containing only a small amount of a rare earth element and Co and having excellent residual magnetic flux density can be produced.

DETAILED DESCRIPTION

Hereinafter, a suitable embodiment of the present invention will be described in detail with reference to drawings as necessary.

(Ferrite Sintered Magnet)

A ferrite sintered magnet according to the embodiment of the present invention is an oxide containing at least Fe, Sr, B, Zn, La, and Co.

A content of Fe in the ferrite sintered magnet is preferably 80 to 95% by mass, and more preferably 87 to 90% by mass, in teams of $Fe_2O_3$. When the content of Fe is in the above-mentioned range, favorable magnetic properties can be obtained.

A content of Sr in the ferrite sintered magnet is preferably 9 to 11% by mass, and more preferably 9 to 10% by mass, in terms of SrO. When the content of Sr is in the above-mentioned range, favorable magnetic properties can be obtained.

When an atomic concentration of Fe of the ferrite sintered magnet is represented by [Fe] and an atomic concentration of Sr of the ferrite sintered magnet is represented by [Sr], it is preferable that the ferrite sintered magnet satisfies $11.3 \leq [Fe]/[Sr] \leq 13.1$. The lower limit may be 11.9 or may be 12.1, and the upper limit may be 12.9 or may be 12.7. A stoichiometric composition is 12, and when the stoichiometric composition is close to 12, the ferrite sintered magnet shows favorable properties.

A content of B in the ferrite sintered magnet is 0.005 to 0.9% by mass in terms of $B_2O_3$.

A content of Zn in the ferrite sintered magnet is 0.01 to 1.2% by mass in terms of ZnO.

When B and Zn are contained in the above-mentioned range, residual magnetic flux density (Br) can be increased without a significant loss of coercive force (HcJ). A squareness ratio (Hk/HcJ) is also likely to be increased.

A saturation magnetization Br may be improved by selectively substituting Zn for Fe sites having a magnetic moment oriented in the anti-parallel direction. The substitution of Zn reduces the magnetocrystalline anisotropy, thus resulting in a decrease in the coercive force, but it is presumed that a magnetic interaction between grains is effectively suppressed due to uniform formation of a grain boundary phase containing B, which prevents a decrease in the coercive force and therefore maintains the coercive force. Since B and Zn contained in the ferrite sintered magnet improves mechanical strength, it is presumed that a part of Zn forms the grain boundary phase along with B, but the detail thereof is not necessarily clear.

From the viewpoint of further increasing the coercive force and the squareness ratio (Hk/HcJ) of the ferrite sintered magnet, the content of B can be preferably 0.01% by mass or more, and more preferably 0.02% by mass or more, in terms of $B_2O_3$. From the viewpoint of further increasing the residual magnetic flux density (Br) of the ferrite sintered magnet, the content of B is preferably 0.4% by mass or less, and more preferably 0.2% by mass or less, in terms of $B_2O_3$.

From the viewpoint of further increasing the residual magnetic flux density (Br) of the ferrite sintered magnet, the content of Zn can be preferably 0.08% by mass or more, and more preferably 0.15% by mass or more, in terms of ZnO. From the viewpoint of further increasing the coercive force and the squareness ratio (Hk/HcJ) of the ferrite sintered magnet, the content of Zn is preferably 0.7% by mass or less, and more preferably 0.4% by mass or less, in teams of ZnO.

The ferrite sintered magnet contains La and Co. When an atomic concentration of La is represented by [La], an atomic concentration of Co is represented by [Co], and an atomic concentration of Zn is represented by [Zn], the ferrite sintered magnet satisfies $[La]/[Zn] \leq 0.79$ and $[Co]/[Zn] \leq 0.67$.

With such a small amount of La and Co being contained, high magnetic properties can be achieved without too much increase in the cost.

The ferrite sintered magnet does not substantially contain a rare earth element other than La, but may contain a rare earth element other than La. The rare earth element other than La refers to Sc, Y, Ce, Pr, Nd, Pm, Sm, Eu, Gd, Tb, Dy, Ho, Er, Tm, Yb, and Lu. A concentration of each component when the rare earth element other than La is contained in the ferrite sintered magnet can be 0.5% by mass or less.

The cost reduction can be achieved when the ferrite sintered magnet contains a small amount of La and Co and does not contain a rare earth element other than La.

The ferrite sintered magnet may contain Ni, but it is preferable that the ferrite sintered magnet does not substantially contain Ni. A concentration of Ni can be 0.02% by mass or less.

"The ferrite sintered magnet does not substantially contain an element A" means that a concentration of the element A in the ferrite sintered magnet is less than 0.005% by mass in terms of oxides. It is preferable that the concentration of the element A be less than 0.001% by mass in terms of oxides.

The ferrite sintered magnet can contain Si (silicon). A content of Si in the ferrite sintered magnet is preferably 0.05 to 1.3% by mass, more preferably 0.2 to 0.5% by mass, and still more preferably 0.25 to 0.36% by mass, in terms of $SiO_2$. Since too much amount of $SiO_2$ is likely to cause a decrease in Br and too small amount of $SiO_2$ is likely to cause a decrease in HcJ, setting the $SiO_2$ content within the above-mentioned range allows the most appropriate grain boundary phase to be formed and high magnetic properties to be easily obtained.

The ferrite sintered magnet can contain Ca (calcium). A content of Ca in the ferrite sintered magnet is preferably 0.15 to 2.0% by mass, more preferably 0.4 to 1.0% by mass, and still more preferably 0.47 to 0.62% by mass, in terms of CaO. Since too much amount of Ca is likely to cause a decrease in HcJ and too small amount of Ca is likely to cause a decrease in Br, setting the Ca content within the above-mentioned range allows the most appropriate grain boundary phase to be formed and high magnetic properties to be easily obtained.

When a total atomic concentration of B, Ca, and Zn in the ferrite sintered magnet is represented by [B+Ca+Zn] and an atomic concentration of Si is represented by [Si], it is preferable that the ferrite sintered magnet satisfies $0.92 \leq [B+Ca+Zn]/[Si] \leq 11.42$.

This formula expresses that the sum of the total molar concentration of B, Ca, and Zn, which are considered as an accessory component forming the grain boundary phase, is divided by a molar concentration of $SiO_2$, which is considered as a main component forming the grain boundary phase. In particular, when the ferrite sintered magnet satisfies the above-mentioned range, the most appropriate grain boundary phase is likely to be formed, and high HcJ and Br are easily obtained.

The ferrite sintered magnet can contain one or more elements selected from Ba (barium), Mn (manganese), Cr (chromium), and Al (aluminium).

When a total atomic concentration of Ca, Sr, Ba, and La is represented by [Ca+Sr+Ba+La], a total atomic concentration of Fe, Mn, Zn, Co, Cr, and Al is represented by [Fe+Mn+Zn+Co+Cr+Al], a total atomic concentration of Si and B is represented by [Si+B], and $Z=([Ca+Sr+Ba+La]-[Fe+Mn+Zn+Co+Cr+Al]/12)/[Si+B]$, the ferrite sintered magnet can satisfy $0.4 \leq Z \leq 3.6$.

Z refers to a composition ratio of a metal and a metalloid of the grain boundary phase, and when the range of the above expression, which expresses a ratio of components that can substitute a ferrite lattice (numerator) and components that do not substitute the ferrite lattice (denominator), is satisfied, particularly favorable magnetic properties can be obtained. In this case, it may be that Mn, Zn, Co, Cr, and Al along with Fe constitute the B site of the Sr ferrite expressed by the formula (2), Ba, Ca, and La along with Sr constitute the A site of the Sr ferrite expressed by the formula (2), and Si and B constitute the grain boundary phase.

When Z is within the predetermined range, Si and B in particular take a central role to form a liquid phase at the time of firing, which results in satisfactory densification, prevents grain growth, and allows each component to be in a homogeneous solid solution form, as compared with a conventional ferrite sintered magnet. As a result, the ferrite sintered magnet shows excellent magnetic properties and high mechanical strength.

On the other hand, when Z is too small, densification is insufficient, and the residual magnetic flux density (Br), coercive force, and the mechanical strength therefore tend to decrease. For that reason, Z in the ferrite sintered magnet is preferably 0.5 or more, and more preferably 0.9 or more. When Z is too large, the grain growth is not sufficiently prevented and the particle size thus becomes uneven, and the residual magnetic flux density (Br), coercive force, mechanical strength, and squareness ratio (Hk/HcJ) therefore tend to decrease. For that reason, Z in the ferrite sintered magnet is preferably 2.5 or less, and more preferably 2.1 or less.

It is preferable that a content of Mn in the ferrite sintered magnet be 0.25 to 1.5% by mass in terms of MnO. It is presumed that replace the Fe site with Mn satisfying the above-mentioned range is likely to improve the magnetic properties and facilitate Zn to be in the solid solution form.

It is preferable that a content of Cr in the ferrite sintered magnet be 0.03 to 0.2% by mass in terms of $Cr_2O_3$. It is presumed that replace the Fe site with Cr satisfying the above-mentioned range is likely to improve the magnetic properties and facilitate Zn to be in the solid solution form.

The ferrite sintered magnet does not necessarily contain Ba, but may contain Ba. It is preferable that a content of Ba be 0 to 0.2% by mass in terms of BaO. When the content of Ba satisfies the above-mentioned range, the magnetic properties (residual magnetic flux density (Br) in particular) can be favorably maintained.

The ferrite sintered magnet does not necessarily contain Al, but may contain Al. A content of Al can be 0 to 0.2% by mass in terms of $Al_2O_3$.

The ferrite sintered magnet does not necessarily contain Na, and it is preferable that the ferrite sintered magnet does not substantially contain Na. It is preferable that a content of Na be 0.005% by mass or less in terms of $Na_2O$. Further, it is preferable that the content of Na be 0.001% by mass or less. The smaller the content of Na, the more superior the moldability.

In addition to these components, the ferrite sintered magnet may contain an inevitable component derived from impurities contained in raw materials or from production facility. Examples of such a component include an oxide of Mg (magnesium), Ti (titanium), Mo (molybdenum), and V (vanadium). It is preferable that a content of these components be 0.06% by mass or less in total.

A content of each component in the ferrite sintered magnet can be measured by X-ray fluorescence analysis and inductively coupled plasma-atomic emission spectroscopy (ICP analysis).

Figure 1:
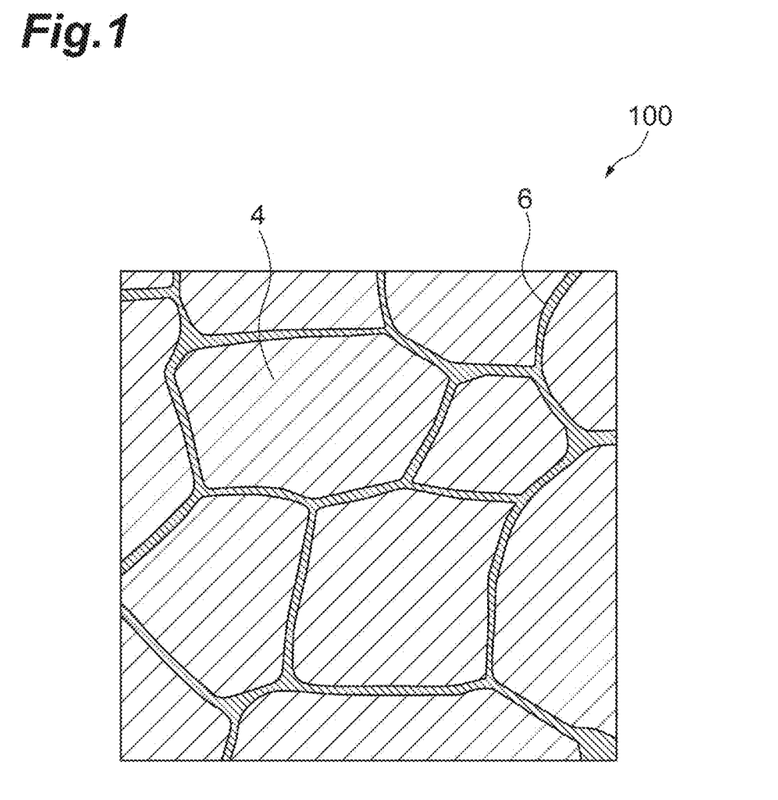
FIG. 1 is a schematic diagram of an example of a cross-section structure of a ferrite sintered magnet of the present invention.

As shown in FIG. 1, a ferrite sintered magnet 100 according to the embodiment of the present invention has grains 4 of the M type Sr ferrite having a hexagonal structure and a grain boundary phase 6 present between the grains 4.

An example of the M type Sr ferrite is a ferrite expressed by the following formula (2).

$$SrFe_{12}O_{19} \quad (2)$$

In the above formula (2), Sr at an A site and Fe at a B site in the M type Sr ferrite may be partly substituted with a different element.

Such a substitutional M type Sr ferrite can be expressed by the following formula (3), for example.

$$Sr_{1-z}R_z(Fe_{12-x}M_x)_yO_{19} \quad (3)$$

In the above formula (3), x ranges, for example, from 0.01 to 0.5, y ranges, for example, from 0.7 to 1.2, and z ranges, for example, from 0.01 to 0.49.

R in the above formula (3) can be at least one element selected from the group consisting of Ca, Ba, and La.

M in the above formula (3) can be at least one or more elements selected from the group consisting of Zn (zinc), Mn (manganese), Co (cobalt), Al (aluminium), and Cr (chromium).

A ratio of the A site and the B site and a ratio of oxygen (O) in the above formulae (2) and (3) may be slightly deviated from the above value as these ratios actually show rather biased value from the above range.

Preferably, the M type Sr ferrite in the ferrite sintered magnet is expressed by the above formula (3), R includes at least La, and M includes at least Zn and Co.

A mass ratio of an M type Sr ferrite phase in the entire grains in the ferrite sintered magnet is preferably 90% or more, more preferably 95% or more, and still more preferably 97% or more. Thus, reducing the mass ratio of the crystal phase different from the M type Sr ferrite phase can further increase the magnetic properties. The mass ratio (%) of the M type Sr ferrite phase in the entire grains in the ferrite sintered magnet can be confirmed by determining an abundance ratio of the M type Sr ferrite phase (mol %) by an X-ray diffraction. The abundance ratio of the M-type Sr ferrite phase is obtained by comparing an X-ray diffraction intensity of a target sample with X-ray diffraction intensities of reference samples in which powders of an M-type ferrite, an orthoferrite, a hematite, a spinel, and a W-type ferrite are mixed at a predetermined ratio.

The average size of grains 4 in the ferrite sintered magnet is preferably 2.0 µm or less, more preferably 1.0 µm or less, and still more preferably 0.3 to 1.0 µm. When the average grain size of the grains is more than 2.0 µm, it tends to be difficult to obtain fully excellent magnetic properties. On the other hand, when the average grain size of the grains is less than 0.3 µm, it tends to be difficult to produce (mass-produce) the ferrite sintered magnet.

It is preferable that the grains contained in the ferrite sintered magnet have small variations in their grain size. Specifically, a proportion of grains having a grain size of 2.0 µm or more relative to the entire grains is preferably 2% or less, and more preferably 1% or less, on the number basis. By improving evenness of the grains, high magnetic properties are further increased, and reliability is enhanced.

It is preferable that a number average value of an aspect ratio (average aspect ratio) of the grains is about 1.0. When the ferrite sintered magnet has such an average aspect ratio, the ferrite sintered magnet having sufficiently high magnetic properties can be provided.

The size of grains of the ferrite sintered magnet can be measured by the following steps. A sample which has been cut out of the ferrite sintered magnet is made into a thin piece to observe with a TEM. Alternatively, a cross section of the sample is polished to mirror finish and then etched with an acid such as a hydrofluoric acid to observe with an SEM. In an SEM or TEM image containing hundreds of grains, an outline of grains is made clear, and the image is then subjected to image processing to measure a grain size distribution of an a-face. The "grain size" in the present specification refers to a major axis of the a-face (diameter in a direction of an a-axis). Further, when the longest diameter passing through the center is referred to as a major diameter and the shortest diameter passing though the center is referred to as a minor diameter, a ratio of the major diameter to the minor diameter is referred to as an "aspect ratio". The sample may be heated and then etched, which is so-called thermal etching, instead of performing the etching with an acid.

From the grain size distribution measured on the number basis, an average value of the size of grains on the number basis can be calculated as D50.

The grain boundary phase 6 has an oxide as a main component. Specifically, examples of the oxide include an oxide having at least one element selected from B (boron), Si (silicon), Ca (calcium), Sr (strontium), Ba (barium), Fe (iron), Mn (manganese), Zn (zinc), Co (cobalt), La (lanthanum), Cr (chromium), and Al (aluminium), and a composite oxide having two or more of these elements. Examples of such an oxide include $SiO_2$, CaO, BaO, $Al_2O_3$, ZnO, CoO, $La_2O_3$, $Fe_2O_3$, MnO, $Cr_2O_3$, and $B_2O_3$. The oxide may contain a silicate glass. The grain boundary phase can contain an oxide in an amount of 90% by mass or more, 95% by mass or more, or 97% by mass or more.

In a cross section of the ferrite sintered magnet, an area ratio of the grain boundary phase 6 relative to the total area of the grains 4 and the grain boundary phase 6 can be 1 to 5%.

The residual magnetic flux density (Br) of the ferrite sintered magnet is preferably 420 mT or more, more preferably 440 mT or more, and still more preferably 450 mT or more. The coercive force of the ferrite sintered magnet is preferably 260 kA/m or more, more preferably 270 kA/m or more, and still more preferably 280 kA/m or more. The squareness ratio (Hk/HcJ) of the ferrite sintered magnet is preferably 85% or more, more preferably 88% or more, and still more preferably 90% or more. In particular, it is preferable that the ferrite sintered magnet has the residual magnetic flux density (Br) of 440 mT or more and the squareness ratio (Hk/HcJ) of 85% or more. The ferrite sintered magnet having such excellent magnetic properties can be more suitably used for motors and generators.

The ferrite sintered magnet can have sufficient mechanical strength. The ferrite sintered magnet having high mechanical strength is easy to handle and improves the production yield as breaking and chipping of the ferrite sintered magnet during transport can be effectively prevented, thereby contributing the cost reduction. Further, the ferrite sintered magnet having high mechanical strength does not easily get destroyed after being installed in products such as a motor, which thus enhances the product reliability.

A shape of the ferrite sintered magnet is not limited to a particular shape and can have various shapes such as an arc segment shape having end faces being curved like an arc-like shape (C shape) and a flat plate-like shape.

The ferrite sintered magnet can be used as a magnetic field generating member of a rotating electric machine such as a motor and a generator, a magnet for a speaker and a headphone, a magnetron tube, a magnetic field generating apparatus for MRI, a damper for a CD-ROM, a sensor for a distributor, a sensor for ABS, a fuel and oil level sensor, a magnet latch, an isolator, or the like. Further, the ferrite sintered magnet can be used as a target (pellet) for foaming a magnetic layer of a magnetic recording medium by a vapor-deposition method or a sputtering method.

(Rotating Electric Machine)

Figure 2:
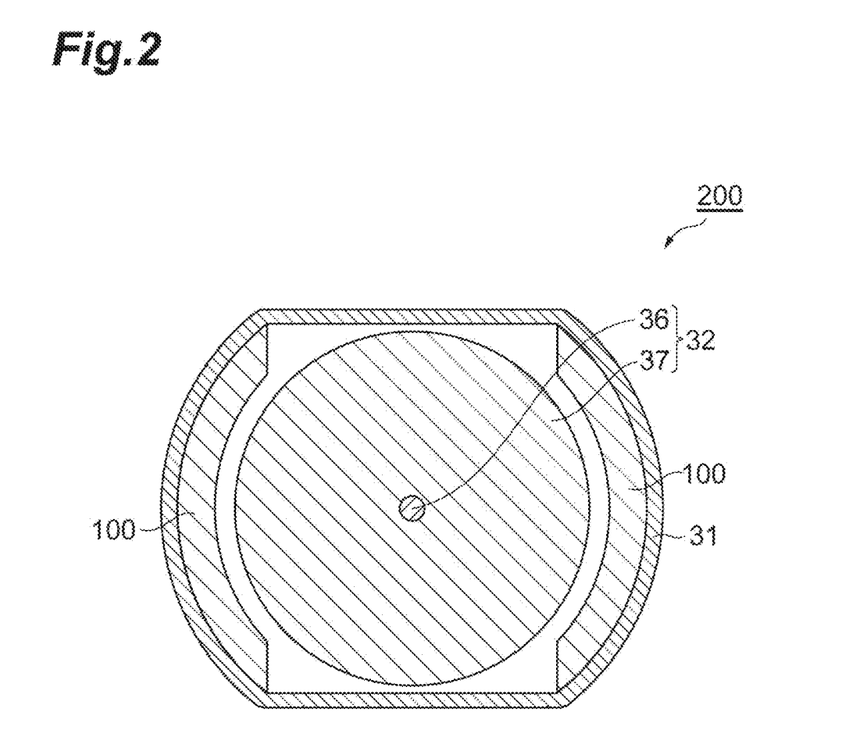
FIG. 2 is a schematic diagram of a cross section of a motor having a ferrite sintered magnet of the present invention.

Next, a motor according to one embodiment of the present invention is shown in FIG. 2. A motor 200 comprises a stator 31, and a rotor 32. The rotor 32 includes a shaft 36 and a rotor core 37. In the motor 200 of this embodiment, the stator 31 is provided with a C-shaped ferrite sintered magnet 100 which is a permanent magnet, and the rotor core 37 of the rotor 32 is provided with an electromagnet (coil).

Since a thickness of the ferrite sintered magnet 100 can be thin as the ferrite sintered magnet 100 has high Br, a space between the stator 31 and the rotor 32 can be made sufficiently small. Therefore, the motor 200 can be reduced in size while maintaining its performance.

The motor may include a rotor provided with a ferrite sintered magnet and a stator provided with an electromagnet (coil). A configuration of the motor is not limited to a particular configuration. Another example of the rotating electric machine is a generator having a rotor and a stator. The ferrite sintered magnet can be similarly provided in the rotor or the stator in this case.

(Production Method)

Next, an example of a method for producing the ferrite sintered magnet will be described. The method for producing the ferrite sintered magnet includes a blending step, a calcination step, a pulverization step, a molding step in a magnetic field, and a firing step. Hereinafter, each step will be described in detail.

The blending step is a step of preparing a mixed powder for calcination. The mixed powder for calcination contains at least Fe and Sr. In the blending step, it is preferable that a powder containing Fe and a powder containing Sr are mixed and pulverized for around 1 to 20 hours with an attritor or a ball mill to give a mixed powder.

When the ferrite sintered magnet contains a metallic element and/or a metalloid element other than Fe and Sr (such as Co, La, Si, Ca, Zn, and B), the metallic element and/or the metalloid element may be preliminarily contained in the powder containing Fe and/or the powder containing Sr, but a different powder containing the metallic element and/or the metalloid element may be added during the blending step to give a mixed powder for calcination. Examples of the different powder include a powder containing Co, a powder containing La, a powder containing Si, a powder containing Ca, a powder containing Zn, and a powder containing B.

Examples of a powder containing each element include a simple substance, an oxide, a hydroxide, carbonate, nitrate, silicate, and an organometallic compound of each element. A powder may contain at least two or more elements selected from the group consisting of Fe, Sr, Co, La, Si, Ca, Zn, and B, or a powder may contain substantially only one element from the above group.

An example of a powder containing Fe is $Fe_2O_3$.

Examples of a powder containing Sr are $SrCO_3$ and SrO.

Examples of a powder containing Co are CoO and $Co_3O_4$.

Examples of a powder containing La are $La_2O_3$ and $La(OH)_3$.

An example of a powder containing Si is $SiO_2$.

Examples of a powder containing Ca are $CaCO_3$ and CaO.

An example of a powder containing Zn is ZnO.

Examples of a powder containing B are $B_2O_3$ and $H_3BO_3$.

An average particle size of a raw powder is not limited to a particular size and is 0.1 to 2.0 pin, for example.

Elements to be added in small amounts such as Cr, Mn, Al, and

Ba, which may be contained in the ferrite sintered magnet as a final product, can be preliminarily contained in the above-mentioned powder. When an amount of these elements to be added in small amounts in the above-mentioned powder is small, a powder containing Cr ($Cr_2O_3$), a powder containing Mn (MnO), a powder containing Al ($Al_2O_3$), and a powder containing Ba (BaO) are added during the blending step as necessary to give a mixed powder for calcination.

A composition of a metallic or a metalloid element in the mixed powder mostly corresponds to a composition of the final product of the ferrite sintered magnet, but does not exactly correspond to the composition of the final product as there are elements that are lost in the production process.

The calcination step is a step of calcining the mixed powder produced in the blending step. The calcination can be performed in an oxidizing atmosphere such as the air atmosphere. A calcination temperature is preferably 850 to 1450° C., more preferably 900 to 1350° C., and still more preferably 1000 to 1300° C., and a calcination time at the calcination temperature is preferably 1 second to 10 hours, and more preferably 1 minute to 3 hours. A content of Sr ferrite in the calcined product produced by the calcination is preferably 70% by mass or more, and more preferably 90% by mass or more. A primary particle size of the calcined product is preferably 10 μm or less, and more preferably 3.0 μm or less.

The pulverization step is a step of producing a powder of a ferrite magnet by pulverizing the calcined product. The pulverization step may be performed in one step or may be separated into two steps including a coarse pulverization step and a fine pulverization step. The calcined product is normally in a granular form or in an agglomerated faun, and thus, it is preferable that the coarse pulverization step is performed first. In the coarse pulverization step, pulverization is performed in a dry system using a vibration rod mill or the like to prepare a pulverized powder having an average particle size of 0.5 to 5.0 μm. The pulverized powder prepared in the above manner is pulverized in a wet system using a wet attritor, a ball mill, a jet mill or the like to produce a fine powder having an average particle size of 0.08 to 5.0 μm, preferably 0.1 to 2.5 μm, and more preferably 0.2 to 2 μm.

A specific surface area of the fine powder in accordance with the BET method is preferably 5 to 14 m$^2$/g, and more preferably 7 to 12 m$^2$/g. A pulverization time is 30 minutes to 20 hours when the wet attritor is used, and 5 to 50 hours when the ball mill is used, for example. It is preferable that the above-mentioned time is appropriately adjusted according to a pulverization method.

In the pulverization step, a powder containing a metallic element and/or a metalloid element (such as Co, La, Si, Ca, Zn, and B) and/or a powder containing elements to be added in small amounts such as Cr, Mn, Al, and Ba may be added to the ferrite magnet powder.

To increase a degree of magnetic orientation of the ferrite sintered magnet, it is preferable that a polyhydric alcohol is added along with the above-described components in the fine pulverization step. An amount of polyhydric alcohol added is 0.05 to 5.0% by mass, preferably 0.1 to 3.0% by mass, and more preferably 0.1 to 2.0% by mass, based on a target material to which the polyhydric alcohol is added. The polyhydric alcohol that has been added is removed by thermal decomposition in the firing step performed after the molding step in a magnetic field.

The molding step in a magnetic field is a step of preparing a green compact by molding the fine powder produced in the pulverization step in the magnetic field. The molding step in a magnetic field can be performed by any of dry molding and wet molding. It is preferable to perform the wet molding from the viewpoint of increasing the degree of magnetic orientation. When the wet molding is performed, a fine pulverization step is performed in a wet system, and the resultant slurry is adjusted to a predetermined concentration and may then be used as a slurry for wet molding. The slurry can be concentrated by centrifugal separation or a filter press, for example.

It is preferable that a content of the fine powder in the slurry for wet molding be 30 to 85% by mass. Water or a non-aqueous solvent can be used as a dispersion medium for the slurry. A surfactant such as gluconic acid, gluconate, and sorbitol may be added to the slurry for wet molding in addition to water. Using such a slurry for wet molding, molding is performed in a magnetic field. A molding pressure is 0.1 to 0.5 tons/cm$^2$, for example, and an applied magnetic field is 5 to 15 kOe, for example.

The firing step is a step of firing the green compact to obtain a sintered body. The firing step is generally performed in an oxidizing atmosphere such as the air atmosphere. A firing temperature is preferably 1050 to 1300° C., and more preferably 1150 to 1250° C. It is preferable that a firing time at the firing temperature be 0.5 to 3 hours. As a result of the above steps, a sintered body, that is, a ferrite sintered magnet can be produced. The method for producing the ferrite sintered magnet of the present invention is not limited to the above-described method.

The preferable embodiment of the present invention is described as above, but the present invention is not limited to the above-described ferrite sintered magnet and motor. For example, a shape of the ferrite sintered magnet is not limited to the shape as shown in FIG. 1 and can be appropriately changed to the shape suitable for each application described as above.

EXAMPLES

Hereinafter, the present invention will be described in detail with reference to Examples and Comparative Examples, but the present invention is not limited to these Examples.

(Preparation of Ferrite Sintered Magnet)
First, the following starting materials were provided.
$Fe_2O_3$ powder (primary particle size: 0.3 μm)
$SrCO_3$ powder (primary particle size: 2 μm)
$SiO_2$ powder (primary particle size: 0.01 μm)
$CaCO_3$ powder
ZnO powder
$B_2O_3$ powder
$Co_3O_4$ powder
$La_2O_3$ powder

Example 1

1000 g of the $Fe_2CO_3$ powder, 161 g of the $SrCO_3$ powder, 12.1 g of the $CaCO_3$ powder, 4.33 g of the $SiO_2$ powder, 3.5 g of the ZnO powder, 0.04 g of the $Co_3O_4$ powder, 0.25 g of the $La_2O_3$ powder, and 0.19 g of the $B_2O_3$ powder were mixed while pulverizing the powders using a wet attritor, and the resultant powder was dried and sized. The powder produced in such a manner was fired in the air atmosphere at 1250° C. for 1 hour to give a granular calcined product. This calcined product was coarsely pulverized using a dry vibration rod mill to prepare a powder having a specific surface area of 1 m$^2$/g in accordance with a BET method.

A predetermined amount of sorbitol was added to 200 g of the coarsely pulverized powder, which was then wet-pulverized using a ball mill for 24 hours to give a slurry. An amount of the sorbitol added was 0.25% by mass based on a mass of the coarsely pulverized powder. The fine powder after pulverization had a specific surface area of 8 to 10 m$^2$/g.

After that, a solid content concentration of the slurry was adjusted, and the resultant slurry was molded using a wet magnetic field molding machine in an applied magnetic field of 12 kOe to give a green compact. Three pieces of such a green compact were prepared. These green compacts were fired in the air atmosphere at 1180, 1195, and 1210° C., respectively, to give cylindrical ferrite sintered magnets (Example 1).

Examples 2 to 10 and Comparative Examples 1 and 2

Magnets of Examples 2 to 10 and Comparative Examples 1 and 2 were produced in the same manner as in Example 1 except that an amount of the $B_2O_3$ powder added was changed.

Examples 11 to 19 and Comparative Examples 3 and 4

Magnets of Examples 11 to 19 and Comparative Examples 3 and 4 were produced in the same manner as in Example 5 except that an amount of the ZnO powder and an amount of the $Co_3O_4$ powder and the $La_2O_3$ powder added were changed.

Examples 21 to 30

Magnets of the Examples 21 to 30 were produced in the same manner as in Example 5 except that an amount of the $SiO_2$ powder added and an amount of the $Co_3O_4$ powder and the $La_2O_3$ powder added were changed.

Examples 31 to 39

Magnets of the Examples 31 to 39 were produced in the same manner as in Example 5 except that an amount of the CaO powder added and an amount of the $Co_3O_4$ powder and the $La_2O_3$ powder added were changed.

Examples 41 to 50

Magnets of Examples 41 to 50 were produced in the same manner as in Example 5 except that an addition ratio of the $Fe_2O_3$ powder and the $SrCO_3$ powder was changed and an amount of the $Co_3O_4$ powder and the $La_2O_3$ powder added was changed.

Examples 51 to 54

A magnet of Example 51 was produced in the same manner as in Example 5 except that an amount of Cr added was reduced by selecting a grade of a raw material containing a small amount of Cr. A magnet of Example 52 was produced in the same manner as in Example 5 except that an amount of Cr added was increased by adding the $Cr_2O_3$ powder.

A magnet of Example 53 was produced in the same manner as in Example 5 except that an amount of Mn added was reduced by selecting a grade of a raw material containing a small amount of Mn. A magnet of Example 54 was produced in the same manner as in Example 5 except that an amount of Mn added was increased by adding the MnO powder.

(Evaluation of Ferrite Sintered Magnet)
<Composition Analysis>

The composition of the ferrite sintered magnet prepared in each Example and Comparative Example was measured by inductively coupled plasma-atomic emission spectroscopy (ICP analysis). In the ferrite sintered magnet, elements derived from impurities contained in the starting material (such as Ba, Al, Mn, and Cr) were detected in addition to Fe, Sr, Co, La, Si, Ca, Zn, B, and the like.

Tables 1 to 6 show the content of detected Fe, Sr, Ba, Al, Si, Ca, Mn, Zn, Cr, Na, B, La, and Co that has been each calculated in terms of $Fe_2O_3$, SrO, BaO, $Al_2O_3$, $SiO_2$, CaO, MnO, ZnO, $Cr_2O_3$, $Na_2O$, $B_2O_3$, $La_2O_3$, and CoO, respectively. The content of these elements is represented by a value (% by mass) based on the entire ferrite sintered magnet.

Tables 1 to 6 show [Fe]/[Sr] when an atomic concentration of Fe is represented by [Fe] and an atomic concentration of Sr is represented by [Sr]; [B+Ca+Zn]/[Si] when a total atomic concentration of B, Ca, and Zn is represented by [B+Ca+Zn] and an atomic concentration of Si is represented by [Si]; $Z=([Ca+Sr+Ba+La]-[Fe+Mn+Zn+Co+Cr+Al]/12)/[Si+B]$ when a total atomic concentration of Ca, Sr, La and Ba is represented by [Ca+Sr+Ba+La] and a total atomic concentration of Fe, Mn, Zn, Co, Cr, and Al is represented by [Fe+Mn+Zn+Co+Cr+Al].

<Evaluation of Magnetic Properties>

The upper and lower sides of the prepared cylindrical ferrite sintered magnet were processed, and then the magnetic properties thereof were measured at 20° C. using a B-H tracer at a maximum applied magnetic field of 25 kOe. In the measurement, the residual magnetic flux density (Br) and the coercive force (HcJ) were determined, and external magnetic field intensity (Hk) when the residual magnetic flux density was 90% of the Br was measured, then the squareness ratio (Hk/HcJ) (%) was calculated from the measurement results of Hk and HcJ. Among the ferrite sintered magnets in Examples and Comparative Examples prepared at a firing temperature of 1180° C., 1195° C., and 1210° C., respectively, the magnetic properties of the ferrite sintered magnet achieving the most good balance between the residual magnetic flux density (Br) and the squareness ratio (Hk/HcJ), which has been prepared at 1195° C., are shown in Tables 1 to 6.

TABLE 1

| | | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| Composition in terms of oxides (% by mass) | $Fe_2O_3$ | 88.771 | 88.659 | 88.653 | 88.632 | 88.678 | 88.655 | 88.664 | 88.584 | 88.450 | 88.196 | 88.664 | 87.742 |
| | SrO | 9.217 | 9.346 | 9.290 | 9.293 | 9.292 | 9.280 | 9.291 | 9.254 | 9.273 | 9.247 | 9.296 | 9.194 |
| | BaO | 0.080 | 0.074 | 0.083 | 0.083 | 0.062 | 0.079 | 0.078 | 0.084 | 0.078 | 0.083 | 0.077 | 0.061 |
| | $Al_2O_3$ | 0.075 | 0.075 | 0.061 | 0.064 | 0.072 | 0.062 | 0.062 | 0.061 | 0.071 | 0.060 | 0.063 | 0.071 |
| | $SiO_2$ | 0.294 | 0.293 | 0.292 | 0.290 | 0.293 | 0.305 | 0.305 | 0.300 | 0.307 | 0.300 | 0.294 | 0.290 |
| | CaO | 0.546 | 0.538 | 0.550 | 0.537 | 0.526 | 0.540 | 0.545 | 0.550 | 0.534 | 0.533 | 0.555 | 0.520 |
| | MnO | 0.348 | 0.348 | 0.348 | 0.348 | 0.348 | 0.349 | 0.348 | 0.347 | 0.345 | 0.345 | 0.349 | 0.344 |
| | ZnO | 0.281 | 0.281 | 0.271 | 0.281 | 0.281 | 0.263 | 0.275 | 0.272 | 0.280 | 0.279 | 0.271 | 0.278 |
| | $Cr_2O_3$ | 0.082 | 0.082 | 0.083 | 0.088 | 0.082 | 0.082 | 0.078 | 0.079 | 0.082 | 0.082 | 0.092 | 0.081 |
| | $Na_2O$ | 0.000 | 0.000 | 0.000 | 0.000 | 0.000 | 0.000 | 0.000 | 0.000 | 0.000 | 0.000 | 0.000 | 0.000 |
| | $B_2O_3$ | 0.006 | 0.015 | 0.030 | 0.045 | 0.067 | 0.076 | 0.095 | 0.140 | 0.252 | 0.558 | 0.000 | 1.104 |
| | $La_2O_3$ | 0.200 | 0.179 | 0.209 | 0.239 | 0.209 | 0.199 | 0.169 | 0.229 | 0.219 | 0.198 | 0.229 | 0.207 |
| | CoO | 0.100 | 0.110 | 0.130 | 0.100 | 0.090 | 0.110 | 0.090 | 0.100 | 0.109 | 0.119 | 0.110 | 0.108 |
| | Total | 100 | 100 | 100 | 100 | 100 | 100 | 100 | 100 | 100 | 100 | 100 | 100 |
| | [Fe]/[Sr] | 12.5 | 12.3 | 12.4 | 12.4 | 12.4 | 12.4 | 12.4 | 12.4 | 12.4 | 12.4 | 12.4 | 12.4 |
| | [B + Ca + Zn]/[Si] | 2.73 | 2.76 | 2.88 | 2.97 | 3.03 | 2.96 | 3.12 | 3.44 | 3.95 | 5.80 | 2.70 | 9.20 |
| | ([Ca + Sr + Ba + La] − [Fe + Mn + Zn + Co + Cr + Al]/12)/[Si + B] | 1.63 | 1.34 | 1.47 | 1.35 | 1.27 | 1.06 | 1.02 | 0.95 | 0.85 | 0.61 | 0.35 | 0.19 |

TABLE 1-continued

|  |  | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
|  | [La]/[Zn] | 0.36 | 0.32 | 0.39 | 0.42 | 0.37 | 0.38 | 0.31 | 0.42 | 0.39 | 0.35 | 0.42 | 0.37 |
|  | [Co]/[Zn] | 0.39 | 0.43 | 0.52 | 0.39 | 0.35 | 0.45 | 0.36 | 0.40 | 0.42 | 0.46 | 0.44 | 0.42 |
| Magnetic properties | Br (mT) | 445.9 | 445.5 | 450.1 | 451.0 | 452.8 | 451.7 | 451.5 | 450.4 | 445 | 440 | 446.9 | 380.3 |
|  | HcJ (kA/m) | 260.3 | 285.1 | 282.2 | 282.6 | 285.3 | 286.4 | 287.3 | 288.6 | 290.3 | 295.5 | 181.2 | 258.4 |
|  | Hk/HcJ (%) | 85.7 | 89.5 | 91.9 | 93.0 | 93.5 | 95.5 | 92.9 | 91.3 | 91 | 90.7 | 76.9 | 75 |

TABLE 2

|  |  | Example 11 | Example 12 | Example 13 | Example 14 | Example 15 | Example 16 | Example 17 | Example 18 | Example 19 | Comparative Example 3 | Comparative Example 4 |
|---|---|---|---|---|---|---|---|---|---|---|---|---|
| Composition in terms of oxides (% by mass) | $Fe_2O_3$ | 88.979 | 88.961 | 88.896 | 88.872 | 88.874 | 88.824 | 88.789 | 88.692 | 88.254 | 88.960 | 87.817 |
|  | SrO | 9.395 | 9.373 | 9.318 | 9.316 | 9.312 | 9.260 | 9.253 | 9.243 | 9.184 | 9.415 | 9.138 |
|  | BaO | 0.079 | 0.084 | 0.078 | 0.084 | 0.062 | 0.080 | 0.081 | 0.081 | 0.078 | 0.079 | 0.078 |
|  | $Al_2O_3$ | 0.063 | 0.059 | 0.061 | 0.060 | 0.072 | 0.062 | 0.061 | 0.061 | 0.062 | 0.062 | 0.062 |
|  | $SiO_2$ | 0.306 | 0.301 | 0.308 | 0.303 | 0.294 | 0.305 | 0.306 | 0.305 | 0.303 | 0.307 | 0.302 |
|  | CaO | 0.548 | 0.539 | 0.552 | 0.539 | 0.527 | 0.545 | 0.550 | 0.549 | 0.543 | 0.559 | 0.541 |
|  | MnO | 0.350 | 0.349 | 0.347 | 0.348 | 0.349 | 0.350 | 0.349 | 0.348 | 0.346 | 0.351 | 0.345 |
|  | ZnO | 0.050 | 0.103 | 0.193 | 0.244 | 0.281 | 0.335 | 0.379 | 0.479 | 0.982 | 0.000 | 1.480 |
|  | $Cr_2O_3$ | 0.102 | 0.104 | 0.109 | 0.106 | 0.082 | 0.102 | 0.105 | 0.105 | 0.101 | 0.109 | 0.101 |
|  | $Na_2O$ | 0.000 | 0.000 | 0.000 | 0.000 | 0.000 | 0.000 | 0.000 | 0.000 | 0.000 | 0.000 | 0.000 |
|  | $B_2O_3$ | 0.068 | 0.067 | 0.068 | 0.068 | 0.067 | 0.067 | 0.067 | 0.067 | 0.067 | 0.068 | 0.067 |
|  | $La_2O_3$ | 0.040 | 0.040 | 0.040 | 0.040 | 0.050 | 0.050 | 0.040 | 0.040 | 0.050 | 0.020 | 0.039 |
|  | CoO | 0.020 | 0.020 | 0.030 | 0.020 | 0.030 | 0.020 | 0.020 | 0.030 | 0.030 | 0.070 | 0.030 |
|  | Total | 100 | 100 | 100 | 100 | 100 | 100 | 100 | 100 | 100 | 100 | 100 |
|  | [Fe]/[Sr] | 12.3 | 12.3 | 12.4 | 12.4 | 12.4 | 12.4 | 12.5 | 12.5 | 12.5 | 12.3 | 12.5 |
|  | [B + Ca + Zn]/[Si] | 2.42 | 2.56 | 2.76 | 2.89 | 3.02 | 3.10 | 3.22 | 3.47 | 4.69 | 2.33 | 5.92 |
|  | ([Ca + Sr + Ba + La] − [Fe + Mn + Zn + Co + Cr + Al]/12)/[Si + B] | 1.12 | 1.08 | 1.05 | 0.97 | 0.95 | 0.92 | 0.89 | 0.88 | 0.86 | 0.77 | 0.69 |
|  | [La]/[Zn] | 0.40 | 0.19 | 0.10 | 0.08 | 0.09 | 0.07 | 0.05 | 0.04 | 0.03 | — | 0.01 |
|  | [Co]/[Zn] | 0.43 | 0.21 | 0.17 | 0.09 | 0.12 | 0.06 | 0.06 | 0.07 | 0.03 | — | 0.02 |
| Magnetic properties | Br (mT) | 432.8 | 440.0 | 450.1 | 452.1 | 452.8 | 452.5 | 452.9 | 451.5 | 450.9 | 417.8 | 450.7 |
|  | HcJ (kA/m) | 302.8 | 301.5 | 288.9 | 286.9 | 285.3 | 283.0 | 280.4 | 271.7 | 262.4 | 302.5 | 238.3 |
|  | Hk/HcJ (%) | 93.5 | 92.4 | 91.5 | 92.8 | 93.5 | 94.0 | 93.1 | 89.9 | 86.7 | 94.2 | 55.2 |

TABLE 3

|  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Composition in terms of oxides (% by mass) | $Fe_2O_3$ | 88.974 | 88.893 | 88.737 | 88.669 | 88.749 | 88.657 | 88.509 | 88.579 | 88.442 | 88.109 |
|  | SrO | 9.226 | 9.217 | 9.360 | 9.354 | 9.299 | 9.279 | 9.431 | 9.271 | 9.283 | 9.248 |
|  | BaO | 0.080 | 0.080 | 0.085 | 0.085 | 0.062 | 0.078 | 0.080 | 0.074 | 0.082 | 0.082 |
|  | $Al_2O_3$ | 0.075 | 0.075 | 0.061 | 0.064 | 0.072 | 0.061 | 0.060 | 0.064 | 0.061 | 0.061 |
|  | $SiO_2$ | 0.080 | 0.162 | 0.231 | 0.269 | 0.294 | 0.341 | 0.380 | 0.444 | 0.588 | 0.971 |
|  | CaO | 0.553 | 0.552 | 0.543 | 0.539 | 0.526 | 0.540 | 0.545 | 0.551 | 0.535 | 0.533 |
|  | MnO | 0.351 | 0.351 | 0.349 | 0.351 | 0.348 | 0.350 | 0.350 | 0.347 | 0.349 | 0.347 |
|  | ZnO | 0.278 | 0.277 | 0.290 | 0.283 | 0.281 | 0.290 | 0.281 | 0.292 | 0.287 | 0.286 |
|  | $Cr_2O_3$ | 0.096 | 0.096 | 0.097 | 0.099 | 0.082 | 0.107 | 0.107 | 0.091 | 0.107 | 0.107 |
|  | $Na_2O$ | 0.000 | 0.000 | 0.000 | 0.000 | 0.000 | 0.000 | 0.000 | 0.000 | 0.000 | 0.000 |
|  | $B_2O_3$ | 0.067 | 0.067 | 0.067 | 0.067 | 0.067 | 0.067 | 0.067 | 0.067 | 0.067 | 0.067 |
|  | $La_2O_3$ | 0.170 | 0.190 | 0.140 | 0.180 | 0.170 | 0.170 | 0.140 | 0.170 | 0.159 | 0.149 |
|  | CoO | 0.050 | 0.040 | 0.040 | 0.040 | 0.050 | 0.060 | 0.050 | 0.050 | 0.040 | 0.040 |
|  | Total | 100 | 100 | 100 | 100 | 100 | 100 | 100 | 100 | 100 | 100 |
|  | [Fe]/[Sr] | 12.5 | 12.5 | 12.3 | 12.3 | 12.4 | 12.4 | 12.2 | 12.4 | 12.4 | 12.4 |
|  | [B + Ca + Zn]/[Si] | 11.42 | 5.63 | 3.95 | 3.35 | 3.02 | 2.66 | 2.39 | 2.08 | 1.53 | 0.92 |
|  | ([Ca + Sr + Ba + La] − [Fe + Mn + Zn + Co + Cr + Al]/12)/[Si + B] | 2.03 | 1.46 | 1.36 | 1.26 | 1.02 | 0.95 | 1.06 | 0.80 | 0.63 | 0.40 |

TABLE 3-continued

|  |  | Example 21 | Example 22 | Example 23 | Example 24 | Example 25 | Example 26 | Example 27 | Example 28 | Example 29 | Example 30 |
| --- | --- | --- | --- | --- | --- | --- | --- | --- | --- | --- | --- |
|  | [La]/[Zn] | 0.31 | 0.34 | 0.24 | 0.32 | 0.30 | 0.29 | 0.25 | 0.29 | 0.28 | 0.26 |
|  | [Co]/[Zn] | 0.20 | 0.16 | 0.15 | 0.15 | 0.19 | 0.22 | 0.19 | 0.19 | 0.15 | 0.15 |
| Magnetic | Br (mT) | 452.1 | 450.5 | 447.9 | 452.5 | 452.8 | 450.6 | 444.4 | 440.0 | 432.6 | 420.0 |
| properties | HcJ (kAJm) | 260.4 | 268.6 | 275.0 | 285.9 | 285.3 | 289.1 | 286.3 | 293.8 | 293.8 | 298.9 |
|  | Hk/HcJ (%) | 85.3 | 87.4 | 90.0 | 90.8 | 93.5 | 93.3 | 95.9 | 95.5 | 95.5 | 95.3 |

TABLE 4

|  |  | Example 31 | Example 32 | Example 33 | Example 34 | Example 35 | Example 36 | Example 37 | Example 38 | Example 39 |
| --- | --- | --- | --- | --- | --- | --- | --- | --- | --- | --- |
| Composition in | $Fe_2O_3$ | 88.640 | 88.457 | 88.338 | 88.510 | 88.440 | 88.433 | 88.186 | 88.132 | 87.545 |
| terms of oxides | SrO | 9.384 | 9.365 | 9.384 | 9.174 | 9.267 | 9.183 | 9.339 | 9.323 | 9.262 |
| (% by mass) | BaO | 0.087 | 0.087 | 0.086 | 0.082 | 0.062 | 0.081 | 0.084 | 0.084 | 0.084 |
|  | $Al_2O_3$ | 0.062 | 0.062 | 0.062 | 0.061 | 0.071 | 0.060 | 0.061 | 0.060 | 0.060 |
|  | $SiO_2$ | 0.303 | 0.302 | 0.299 | 0.305 | 0.293 | 0.305 | 0.301 | 0.300 | 0.298 |
|  | CaO | 0.169 | 0.343 | 0.439 | 0.501 | 0.525 | 0.589 | 0.641 | 0.744 | 1.382 |
|  | MnO | 0.350 | 0.350 | 0.349 | 0.347 | 0.347 | 0.347 | 0.350 | 0.349 | 0.347 |
|  | ZnO | 0.285 | 0.285 | 0.276 | 0.285 | 0.280 | 0.277 | 0.279 | 0.281 | 0.279 |
|  | $Cr_2O_3$ | 0.096 | 0.096 | 0.104 | 0.092 | 0.082 | 0.092 | 0.096 | 0.094 | 0.093 |
|  | $Na_2O$ | 0.000 | 0.000 | 0.000 | 0.000 | 0.000 | 0.000 | 0.000 | 0.000 | 0.000 |
|  | $B_2O_3$ | 0.067 | 0.067 | 0.067 | 0.067 | 0.067 | 0.067 | 0.067 | 0.067 | 0.067 |
|  | $La_2O_3$ | 0.428 | 0.437 | 0.427 | 0.437 | 0.417 | 0.417 | 0.437 | 0.447 | 0.425 |
|  | CoO | 0.129 | 0.149 | 0.169 | 0.139 | 0.149 | 0.149 | 0.159 | 0.119 | 0.158 |
|  | Total | 100 | 100 | 100 | 100 | 100 | 100 | 100 | 100 | 100 |
| [Fe]/[Sr] |  | 12.3 | 12.3 | 12.2 | 12.5 | 12.4 | 12.5 | 12.3 | 12.3 | 12.3 |
| [B + Ca + Zn]/[Si] |  | 1.67 | 2.30 | 2.64 | 2.83 | 3.02 | 3.12 | 3.35 | 3.73 | 6.05 |
| ([Ca + Sr + Ba + La] − [Fe + Mn + Zn + Co + Cr + Al]/12)/[Si + B] |  | 0.46 | 0.91 | 1.20 | 1.04 | 1.23 | 1.27 | 1.68 | 1.95 | 3.59 |
| [La]/[Zn] |  | 0.75 | 0.77 | 0.77 | 0.77 | 0.74 | 0.75 | 0.78 | 0.79 | 0.76 |
| [Co]/[Zn] |  | 0.49 | 0.57 | 0.67 | 0.53 | 0.58 | 0.58 | 0.62 | 0.46 | 0.62 |
| Magnetic | Br (mT) | 440.0 | 444.0 | 445.2 | 450.1 | 452.8 | 451.6 | 451.9 | 452.3 | 452.5 |
| properties | HcJ (kA/m) | 264.5 | 269.0 | 271.1 | 286.4 | 285.3 | 281.1 | 277.3 | 270.5 | 263.6 |
|  | Hk/HcJ (%) | 93.1 | 91.1 | 88.8 | 90.3 | 93.5 | 90.5 | 91.0 | 88.9 | 86.5 |

TABLE 5

|  |  | Example 41 | Example 42 | Example 43 | Example 44 | Example 45 | Example 46 | Example 47 | Example 48 | Example 49 | Example 50 |
| --- | --- | --- | --- | --- | --- | --- | --- | --- | --- | --- | --- |
| Composition in | $Fe_2O_3$ | 88.114 | 88.251 | 88.373 | 88.455 | 88.518 | 88.643 | 88.799 | 88.809 | 88.896 | 89.027 |
| terms of oxides | SrO | 9.855 | 9.709 | 9.554 | 9.495 | 9.396 | 9.288 | 9.179 | 9.081 | 9.010 | 8.884 |
| (% by mass) | BaO | 0.069 | 0.062 | 0.062 | 0.061 | 0.066 | 0.062 | 0.064 | 0.059 | 0.059 | 0.062 |
|  | $Al_2O_3$ | 0.071 | 0.071 | 0.071 | 0.071 | 0.070 | 0.071 | 0.070 | 0.071 | 0.071 | 0.072 |
|  | $SiO_2$ | 0.294 | 0.292 | 0.292 | 0.292 | 0.291 | 0.293 | 0.294 | 0.301 | 0.298 | 0.295 |
|  | CaO | 0.536 | 0.523 | 0.524 | 0.538 | 0.522 | 0.526 | 0.524 | 0.532 | 0.539 | 0.528 |
|  | MnO | 0.350 | 0.346 | 0.347 | 0.348 | 0.352 | 0.348 | 0.349 | 0.348 | 0.350 | 0.350 |
|  | ZnO | 0.272 | 0.279 | 0.280 | 0.271 | 0.281 | 0.281 | 0.263 | 0.275 | 0.272 | 0.282 |
|  | $Cr_2O_3$ | 0.093 | 0.082 | 0.082 | 0.083 | 0.088 | 0.082 | 0.082 | 0.078 | 0.079 | 0.082 |
|  | $Na_2O$ | 0.000 | 0.000 | 0.000 | 0.000 | 0.000 | 0.000 | 0.000 | 0.000 | 0.000 | 0.000 |
|  | $B_2O_3$ | 0.067 | 0.067 | 0.067 | 0.067 | 0.067 | 0.067 | 0.067 | 0.067 | 0.067 | 0.068 |
|  | $La_2O_3$ | 0.239 | 0.288 | 0.318 | 0.279 | 0.319 | 0.309 | 0.279 | 0.339 | 0.329 | 0.310 |
|  | CoO | 0.040 | 0.030 | 0.030 | 0.040 | 0.030 | 0.030 | 0.030 | 0.040 | 0.030 | 0.040 |
|  | Total | 100 | 100 | 100 | 100 | 100 | 100 | 100 | 100 | 100 | 100 |
| [Fe]/[Sr] |  | 11.6 | 11.8 | 12.0 | 12.1 | 12.2 | 12.4 | 12.6 | 12.7 | 12.8 | 13.0 |
| [B + Ca + Zn]/[Si] |  | 3.03 | 3.02 | 3.03 | 3.06 | 3.03 | 3.03 | 2.96 | 2.95 | 3.00 | 3.02 |
| ([Ca + Sr + Ba + La] − [Fe + Mn + Zn + Co + Cr + Al]/12)/[Si + B] |  | 2.00 | 1.79 | 1.58 | 1.49 | 1.34 | 1.16 | 0.95 | 0.86 | 0.76 | 0.52 |
| [La]/[Zn] |  | 0.44 | 0.52 | 0.57 | 0.51 | 0.57 | 0.55 | 0.53 | 0.62 | 0.60 | 0.55 |
| [Co]/[Zn] |  | 0.16 | 0.12 | 0.12 | 0.16 | 0.12 | 0.12 | 0.12 | 0.16 | 0.12 | 0.15 |
| Magnetic | Br (mT) | 445.9 | 445.9 | 446.1 | 450.7 | 450.5 | 452.8 | 450.1 | 450.1 | 445.2 | 440.0 |
| properties | HcJ (kA/m) | 260.4 | 269.1 | 274.4 | 283.3 | 283.5 | 285.3 | 282.2 | 280.9 | 270.5 | 260.3 |
|  | Hk/HcJ (%) | 86.0 | 87.0 | 89.0 | 90.4 | 91.9 | 93.5 | 92.2 | 90.5 | 89.5 | 86.0 |

TABLE 6

|  |  | Example 51 | Example 52 | Example 53 | Example 54 |
|---|---|---|---|---|---|
| Composition in terms of oxides (% by mass) | $Fe_2O_3$ | 88.885 | 88.795 | 88.808 | 87.713 |
|  | SrO | 9.314 | 9.221 | 9.405 | 9.279 |
|  | BaO | 0.062 | 0.081 | 0.085 | 0.084 |
|  | $Al_2O_3$ | 0.072 | 0.061 | 0.062 | 0.060 |
|  | $SiO_2$ | 0.294 | 0.306 | 0.303 | 0.299 |
|  | CaO | 0.525 | 0.533 | 0.542 | 0.522 |
|  | MnO | 0.349 | 0.348 | 0.250 | 1.484 |
|  | ZnO | 0.282 | 0.278 | 0.281 | 0.280 |
|  | $Cr_2O_3$ | 0.030 | 0.200 | 0.096 | 0.093 |
|  | $Na_2O$ | 0.000 | 0.000 | 0.000 | 0.000 |
|  | $B_2O_3$ | 0.067 | 0.067 | 0.068 | 0.067 |
|  | $La_2O_3$ | 0.080 | 0.080 | 0.070 | 0.089 |
|  | CoO | 0.040 | 0.030 | 0.030 | 0.030 |
|  | Total | 100 | 100 | 100 | 100 |
| [Fe]/[Sr] |  | 12.4 | 12.5 | 12.3 | 12.3 |
| [B + Ca + Zn]/[Si] |  | 3.01 | 2.91 | 2.99 | 2.95 |
| ([Ca + Sr + Ba + La] – [Fe + Mn + Zn + Co + Cr + Al]/12)/[Si + B] |  | 0.95 | 0.83 | 1.13 | 0.89 |
| [La]/[Zn] |  | 0.14 | 0.14 | 0.12 | 0.16 |
| [Co]/[Zn] |  | 0.15 | 0.12 | 0.12 | 0.12 |
| Magnetic properties | Br (mT) | 452.8 | 450.1 | 451.9 | 450.1 |
|  | HcJ (kA/m) | 285.3 | 289.0 | 280.4 | 289.8 |
|  | Hk/HcJ (%) | 93.5 | 90.5 | 91.4 | 90.3 |

As shown in Tables 1 to 6, in the ferrite sintered magnet of each Example, the residual magnetic flux density (Br) was 420 mT or more. The coercive force (HcJ) was 260 kA/m or more and the squareness ratio (Hk/HcJ) was 85% or more. Further, the strength was above a certain level. That is, it is confirmed that the ferrite sintered magnet of the present invention, which contains B and Zn in an amount within a specific range, shows excellent magnetic properties.

4 . . . Grains, 6 . . . Grain boundary phase, 100 . . . Ferrite sintered magnet, 200 . . . Motor.

What is claimed is:

1. A ferrite sintered magnet comprising an M type Sr ferrite having a hexagonal structure as a main phase, wherein
the ferrite sintered magnet comprises La and Co,
a content of B is 0.005 to 0.9% by mass in terms of $B_2O_3$,
a content of Zn is 0.01 to 1.2% by mass in terms of ZnO, and
the ferrite sintered magnet satisfies $[La]/[Zn] \leq 0.79$ and $[Co]/[Zn] \leq 0.67$ when an atomic concentration of La is represented by [La], an atomic concentration of Co is represented by [Co], and an atomic concentration of Zn is represented by [Zn].

2. The ferrite sintered magnet according to claim 1, wherein a content of Si is 0.05 to 1.3% by mass in terms of $SiO_2$.

3. The ferrite sintered magnet according to claim 1, wherein a content of Ca is 0.15 to 2.0% by mass in terms of CaO.

4. The ferrite sintered magnet according to claim 1, wherein the ferrite sintered magnet satisfies $11.3 \leq [Fe]/[Sr] \leq 13.1$ when an atomic concentration of Fe is represented by [Fe] and an atomic concentration of Sr is represented by [Sr].

5. The ferrite sintered magnet according to claim 1, wherein the ferrite sintered magnet further includes one or more of Ca and Si, and wherein the ferrite sintered magnet satisfies $0.92 \leq [B+Ca+Zn]/[Si] \leq 11.42$ when a total atomic concentration of B, Ca, and Zn is represented by [B+Ca+Zn] and an atomic concentration of Si is represented by [Si].

6. The ferrite sintered magnet according to claim 1, wherein the ferrite sintered magnet further includes one or more of Ca, Ba, Mn, Cr, Al, and Si, and wherein the ferrite sintered magnet satisfies $0.4 \leq Z \leq 3.6$ when a total atomic concentration of Ca, Sr, Ba, and La is represented by [Ca+Sr+Ba+La], a total atomic concentration of Fe, Mn, Zn, Co, Cr, and Al is represented by [Fe+Mn+Zn+Co+Cr+Al], a total atomic concentration of Si and B is represented by [Si+B], and $Z=([Ca+Sr+Ba+La]-[Fe+Mn+Zn+Co+Cr+Al]/12)/[Si+B]$.

7. The ferrite sintered magnet according to claim 1, comprising 0.25 to 1.5% by mass of Mn in terms of MnO.

8. The ferrite sintered magnet according to claim 1, comprising 0.03 to 0.2% by mass of Cr in terms of $Cr_2O_3$.

9. A rotating electric machine comprising the ferrite sintered magnet according to claim 1.

* * * * *